Dec. 12, 1967     V. A. NOLAN     3,358,166

DYNAMOELECTRIC MACHINE BRUSH

Filed July 9, 1965

INVENTOR
VALERY A. NOLAN
BY
ATTORNEY

United States Patent Office 3,358,166
Patented Dec. 12, 1967

3,358,166
DYNAMOELECTRIC MACHINE BRUSH
Valery A. Nolan, Richardson, Tex., assignor to Air Reduction Company, Incorporated, New York, N.Y., a corporation of New York
Filed July 9, 1965, Ser. No. 470,767
6 Claims. (Cl. 310—228)

ABSTRACT OF THE DISCLOSURE

An electrographitic brush having a transverse copper-graphite insert in the operative face thereof is disclosed in combination with the silicone vapor-contaminated atmosphere of an enclosed dynamoelectric machine of the type including silicone insulated windings. The combination recited is found to substantially reduce wear in the brush element as compared to a combination minus the said insert.

---

This application relates to dynamoelectric machines, and more particularly to totally enclosed or sealed dynamoelectric machines which have silicone resin insulated windings.

The use of silicone resins as the insulating material in dynamoelectric machines has become advantageous for several reasons. The silicone insulation will withstand much higher temperatures than other electrical insulating materials and hence can more easily be used in totally enclosed dynamoelectric machines where temperatures are normall very high. Further, the total amount of insulation required for a given dynamoelectric unit is less when silicone insulation is used, and this permits a substantial reduction in the physical size of dynamoelectric machines required to do a particular job. This reduction in size is of paramount importance in many applications where space is critical, as for example, in aircraft and submarines. However, the silicone insulated machines are subject to one large disadvantage in that the brush life of the machines is greatly reduced when the brushes are operated in the silicone atmosphere created by the insulation. The brush wear is so rapid as to make the use of the otherwise desirable silicone insulating materials less than feasible. It is thus apparent that if the advantageous properties of the silicone insulated dynamoelectric machines are to be utilized, it is necessary to develop some means for reducing the brush wear in silicone atmospheres.

It should be pointed out that when conventional brushes are used in dynamoelectric machines which are not sealed and which are operated in ambient silicone atmospheres produced, for example, by manufacturing plants which utilize silicones in their processes, the brushes are also subject to excessive wear.

The conventional brush used with standard size dynamoelectric units is an electrographic brush. I have discovered that the brush wear in a sealed silicone insulated unit may be substantially reduced by utilizing an electrographitic brush having a relatively small amount by volume of copper suitably inserted therein. Since copper cannot be retained in a brush at graphitization temperatures, the copper must be added to the electrographitic brush after graphitization of the brush body. The copper must also be added to the brush in such a manner and in such quantities as will produce a low friction coefficient and good commutating properties. For reasons which will hereinafter appear, the preferred manner in which this is done is by inserting a relatively thin insert composed of copper or copper-graphite mixture into the brush body.

It is therefore an object of this invention to provide an improved dynamoelectric machine. It is a further object of this invention to provide a totally enclosed silicone insulated dynamoelectric machine having improved brush life.

The exact nature of this invention, as well as other objects, features, and advantages of the invention, will be readily apparent as the disclosure proceeds.

In the drawing forming a part hereof, in which like reference characters indicate corresponding parts in all the views.

Figure 1:
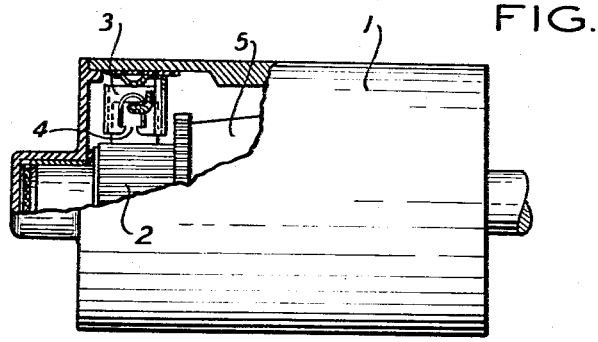
FIG. 1 is a side view of a dynamoelectric unit having a portion of the exterior broken away to show the brush and commutator arrangement according to the present invention.
Figure 2:
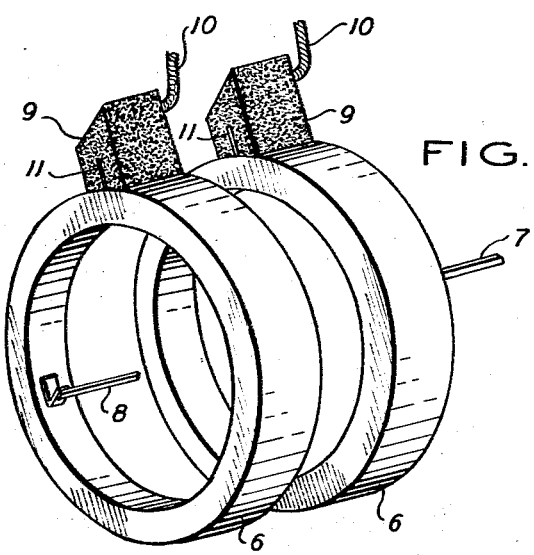
FIG. 2 is a schematic representation of slip rings with brushes which may be used in the dynamoelectric machine of the present invention.

Referring to the drawing, FIG. 1 shows a dynamoelectric machine 1 which is totally enclosed or sealed unit. The unit 1 shown is of the conventional type and includes a shaft which carries and rotates with a commutator 2. The commutator 2 may be replaced by slip rings such as shown in FIG. 2 for certain machines. The brush holder 3 and brush 4, shown more clearly in FIG. 2, may be used with either alternating or direct current dynamoelectric units. The unit includes a conventional wound armature 5 which utilizes silicone resin as the insulating material. The dynamoelectric unit may contain a conventional field structure of either the permanent magnet or wound type insulated with silicone. The sealed or enclosed dynamoelectric unit is of conventional mechanical design and shown only as illustrative of many dynamoelectric machines which may advantageously employ silicone insulation and the modified electrographitic brush of the present invention.

Figure 3:
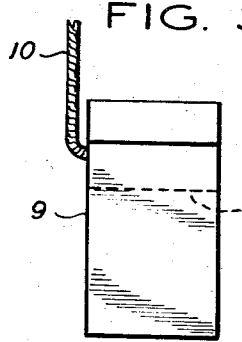
FIG. 3 is a side view of a brush containing an insert which is used in the dynamoelectric unit of this invention.
Figure 4:
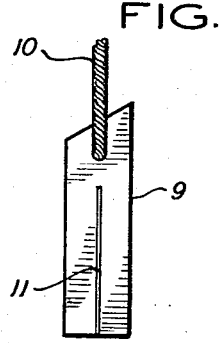
FIG. 4 is an end view of the brush in FIG. 3.

FIGURES 3 and 4 illustrate an electrographitic brush 9 having suitable electrical leads 10 and a copper or copper-graphite insert 11. The insert is mounted in the brush in a transverse direction and is rigidly held in place by a press fit. Alternatively, a suitable adhesive agent such as a phenolic resin may be used to insure that the insert is held in place. FIGURE 3 illustrates that the copper insert is mounted transversely in the brush so as to parallel the commutator slots and is of the same width as the brush. The insert may be in the form of a rectangular sheet as shown or may take any other suitable shape. A brush of this type is particularly suitable for long life and good commutating ability in silicone insulated dynamoelectric units or ventilated machines operating in silicone vapor ambients.

Where a copper or copper-graphite insert is used in a brush, the amount of copper in the insert should be 40% to 75% of the total weight of the insert in order to produce the increased life in silicone atmospheres and at the same time obtain good commutating properties. The preferred range of the copper in the insert of the brush for optimum results is 60% to 70% by weight.

In the event that an insert consisting of copper is used in the brush, care must be taken to assure that the thickness of the insert is not so large as to span adjacent commutator segments of the dynamoelectric machine in which the brush is used. Should the copper insert span and consequently short circuit the commutator bars, the circulating currents could possibly damage the commutator. On the other hand, if the insert is a copper-graphite mixture with a substantial amount of graphite therein, the resistance of the insert will be relatively high so that damage to the commutator from circulating currents will not occur in the event that the copper-graphite insert spans adjacent commutator bars. Therefore, when a copper insert is used, its thickness would normally vary between 1/16 and 1/32 of an inch. If a copper-graphite composition insert is used, the thickness of the insert may be slightly greater than in the case of the copper insert. In any event, the thickness of the insert should be in the range of 10% to 20% of the total thickness of the brush.

Referring to FIG. 2 of the drawing, the slip rings 6 shown with the brushes 4 may be substituted in a conventional manner for the armature and brush arrangement of FIG. 1. The slip rings may be connected in circuit as desired by means of leads 7 and 8.

In the manufacture of an electrographitic brush, it is conventional to mold the carbonaceous raw materials, bake the materials for a prescribed period to produce a carbon brush, and then treat the materials by heating to graphitization temperatures, generally in excess of 2500° C., for a predetermined amount of time to convert the carbon brush to an electrographitic brush. In manufacturing an electrographitic brush which contains copper as necessary for use in silicone insulated units, one must bear in mind that it is not possible to add the copper to the electrographitic brush prior to graphitization and to retain it after graphitization. This is true since copper cannot be retained at the lowest graphitization temperature which is 2200° C. The copper or copper-graphite insert shown in FIGURES 3 and 4 provides ease in manufacture of an electrographitic brush designed for advantageous use in silicone atmospheres and at the same time permits the amount of copper for selected uses to be varied widely, either by changing the thickness of the insert, or by varying the percentage of the copper in the insert, or by using both means. In addition, the insert brush produces excellent commutation without damage to the commutator or slip rings.

As previously pointed out, it is not possible to add copper to electrographitic brushes in the form of powder, since the high temperatures of graphitization would not allow retention of the copper in the brush. One procedure for distributing copper in an electrographitic brush is to impregnate the finished electrographitic brush with copper salts solutions of such salts, or fused copper. If this method of including copper in the electrographitic brush is utilized, the amount of copper by weight should be kept low, i.e. less than 10%, to avoid excessive reduction of the contact resistance of the electrographitic brush which would result in poor commutating qualities. Even with the low amount of copper present in the brushes, the friction is considerably higher than that present when the insert brush is used. The high friction results in excessive sparking and commutator wear. For this reason, the copper insert electrographitic brush of this invention is by far the most satisfactory means for achieving increased brush life in silicone atmospheres, while at the same time maintaining excellent commutating properties. However, in spite of certain other disadvantages, brushes containing copper also produce increased brush life when used in silicone atmospheres.

In addition to impregnating a finished electrographitic brush with copper in an effort to increase brush life in a silicone atmosphere, it has also been suggested that a graphite brush having copper powder dispersed therein would produce the desired results. I prefer to refer to such a brush as a copper-graphite brush.

It should be noted that electrographitic brushes are those in which the basic contents, including the binder, have been subjected to graphitization temperatures. This would not include organic treatments which in some cases may be added to the brush after graphitization. On the other hand, the binder of graphite brushes has not been subjected to graphitization temperatures.

If it is desired to make a graphite brush having copper powder dispersed therein, i.e. a copper-graphite brush, a carbonaceous material such as petroleum coke is calcined and graphitized to form graphite powder. A mixture consisting of the graphite powder, a binder material such as pitch, and copper powder, is prepared. This mixture is milled, molded, and baked in the usual way, but is not graphitized since the carbonaceous filler was pregraphitized. It has been found, however, that such a copper-graphite brush is subject to the same disadvantage of high friction and results in sparking and high commutator wear during operation as was observed in the case of electrographitic brushes which had been impregnated with copper.

The following chart illustrates that the insert brush produces greatly increased brush life when used in the silicone atmosphere. The chart compares a copper-graphite insert brush of this invention, the insert comprising in this example 65% copper and balance graphite, with a commercial copper-graphite brush and to commercial electrographitic brushes.

| Brush | Atmosphere | Wear, In./ 1,000 hr. |
| --- | --- | --- |
| Copper insert brush of this invention | Silicone | 0.49 |
| Commercial copper-graphite brush | do | 1.53 |
| Commercial electrographitic brush #1 | do | 3.0 |
| Commercial electrographitic brush #2 | do | 3.82 |

In view of the tremendously increased brush life by utilization of the copper insert brush in the silicone atmosphere, it would also appear that excessive sparking would occur in the use of the brush. However, "Black Band" commutation tests established that the insert does not have an adverse effect on the Black Band width and therefore on commutation. In addition, a test having a total running time of 371 hours in silicone atmosphere indicated that there was no evidence of excessive commutator wear.

The preferred embodiment of the invention has been illustrated and described, but changes and modifications can be made, and some features can be used in different combinations without departing from the invention defined in the following claims.

I claim:

1. The combination with an enclosed dynamoelectric machine having rotating commutating means and silicone-insulated windings which give off enclosure-contaminating silicone vapors, of an electrographitic brush adapted for bearing on said commutating means and for conducting electric current in cooperation with said windings, said brush having a copper-graphite insert therein at the face of said brush bearing on said commutating means.

2. Apparatus according to claim 1 wherein said insert is positioned at said brush face in a slot therein which is transverse to the body of said brush and to the peripheral direction of commutator rotation.

3. Apparatus according to claim 2 wherein the thickness of said insert is 10% to 20% of the total thickness of said brush and consists essentially of 10% to 75% by weight copper and the balance graphite.

4. Apparatus according to claim 2 wherein said insert consists essentially of 60% to 70% copper and the balance graphite.

5. Apparatus according to claim 2 wherein the copper contained in said insert comprises 40% to 75% by weight to the total weight of the insert.

6. The combination with an enclosed dynamoelectric machine having rotating commutating means and silicone-insulated windings which give off enclosure-contaminating silicone vapors, of an electrographitic brush adapted for bearing on said commutating means and for conducting electric current in cooperation with said windings, said brush having a copper insert positioned at the face of said brush which bears on said commutating means, said insert being positioned in a slot in said face which is transverse to the body of said brush and to the peripheral direction of commutation rotation.

References Cited

UNITED STATES PATENTS

| | | | |
|---|---|---|---|
| 428,742 | 5/1890 | Brush | 252—503 X |
| 2,105,038 | 1/1938 | Helwig | 310—228 |
| 2,172,045 | 9/1939 | Burr et al. | 310—228 |
| 2,736,830 | 2/1956 | Savage | 310—228 |
| 2,748,300 | 5/1956 | Moberly | 310—253 X |
| 2,855,528 | 10/1958 | Krellner | 310—253 X |

FOREIGN PATENTS 325,287  2/1930  Great Britain.

MILTON O. HIRSHFIELD, *Primary Examiner.*

D. F. DUGGAN, *Assistant Examiner.*